(12) United States Patent
Eguchi et al.

(10) Patent No.: US 8,722,799 B2
(45) Date of Patent: May 13, 2014

(54) THERMOPLASTIC ELASTOMER COMPOSITION

(75) Inventors: Yutaka Eguchi, Tokyo (JP); Shinichi Shibayama, Tokyo (JP); Yoshifumi Araki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 325 days.

(21) Appl. No.: 13/133,866

(22) PCT Filed: Dec. 4, 2009

(86) PCT No.: PCT/JP2009/006647
§ 371 (c)(1),
(2), (4) Date: Jul. 21, 2011

(87) PCT Pub. No.: WO2010/067564
PCT Pub. Date: Jun. 17, 2010

(65) Prior Publication Data
US 2011/0281994 A1 Nov. 17, 2011

(30) Foreign Application Priority Data

Dec. 10, 2008 (JP) ................................. 2008-314801

(51) Int. Cl.
*C08L 23/08* (2006.01)
*C08L 23/12* (2006.01)
*C08L 53/02* (2006.01)

(52) U.S. Cl.
USPC .................... 525/89; 525/95; 525/98; 525/99

(58) Field of Classification Search
USPC .......................................... 525/89, 95, 98, 99
See application file for complete search history.

(56) References Cited

U.S. PATENT DOCUMENTS

| | | | |
|---|---|---|---|
| 4,501,857 A | 2/1985 | Kishimoto et al. | |
| 4,603,155 A | 7/1986 | Muramori et al. | |
| 4,673,714 A | 6/1987 | Kishimoto et al. | |
| 5,156,856 A | 10/1992 | Iwasaki et al. | |
| 5,278,272 A | 1/1994 | Lai et al. | |
| 5,702,827 A | 12/1997 | Itoh et al. | |
| 2002/0151649 A1* | 10/2002 | Enami et al. | 525/88 |
| 2003/0096912 A1 | 5/2003 | Kawasaki et al. | |
| 2006/0205890 A1* | 9/2006 | Sasagawa et al. | 525/333.3 |
| 2008/0118750 A1 | 5/2008 | Sasagawa et al. | |

FOREIGN PATENT DOCUMENTS

| | | |
|---|---|---|
| CA | 1034289 | 7/1978 |
| GB | 985614 | 3/1965 |
| JP | 36-019286 | 5/1958 |
| JP | 42-8704 | 4/1967 |
| JP | 43-6636 | 3/1968 |
| JP | 43-17979 | 7/1968 |
| JP | 46-32415 | 9/1971 |
| JP | 48-2423 | 1/1973 |
| JP | 48-4106 | 2/1973 |
| JP | 49-36957 | 10/1974 |
| JP | 56-28925 | 7/1981 |
| JP | 59-166518 | 9/1984 |
| JP | 60-186577 | 9/1985 |
| JP | 63-4841 | 2/1988 |
| JP | 1-37970 | 8/1989 |
| JP | 1-53851 | 11/1989 |
| JP | 2-9041 | 2/1990 |
| JP | 3-163088 | 7/1991 |
| JP | 08-109219 | 4/1996 |
| JP | 08-120127 | 5/1996 |
| JP | 09-137001 | 5/1997 |
| JP | 2737251 | 1/1998 |
| JP | 2000-072885 | 3/2000 |
| JP | 2001-049051 | 2/2001 |
| JP | 2004-067798 | 3/2004 |
| JP | 2004-339339 | 12/2004 |
| JP | 2005-089656 | 4/2005 |

OTHER PUBLICATIONS

Supplementary European Search Report issued in the corresponding European Patent Application No. 09831672.2 dated Apr. 2, 2012.
Kolthoff, Determination of Polystyrene in GR-S Rubber, Journal of Polymer Science, 5, 429-433, 1946.

* cited by examiner

*Primary Examiner* — Jeffrey Mullis
(74) *Attorney, Agent, or Firm* — Morgan, Lewis & Bockius LLP

(57) ABSTRACT

There is provided a thermoplastic elastomer composition having excellent flexibility, mechanical properties, scratch resistance, abrasion resistance, and low-temperature characteristics. A crosslinked thermoplastic elastomer composition comprising 5 to 70 parts by mass of (C) a hydrogenated product of a block copolymer having at least one conjugated diene monomer unit block and at least one vinyl aromatic monomer unit block, and 20 to 150 parts by mass of (D) an olefin-based resin, based on 100 parts by mass of the total of (A) an ethylene-α-olefin copolymer comprising an ethylene unit and an α-olefin unit having 3 to 20 carbon atoms, and (B) a copolymer having at least one hydrogenated copolymer block mainly composed of a conjugated diene monomer unit and a vinyl aromatic monomer unit, wherein a mass ratio ((A)/(B)) of the (A) component and the (B) component is from 20/80 to 75/25.

11 Claims, No Drawings

THERMOPLASTIC ELASTOMER COMPOSITION

CROSS-REFERENCE TO RELATED APPLICATIONS

The present application is a U.S. National Phase Application of International Application PCT/JP2009/006647 filed Dec. 4, 2009, which claims the benefit of Japanese Patent Application No. 2008-314801, filed Dec. 10, 2008, which are hereby incorporated by reference in their entirety.

TECHNICAL FIELD

The present invention relates to a thermoplastic elastomer composition. More particularly, the present invention relates to an olefin-based thermoplastic elastomer composition.

BACKGROUND ART

A thermoplastic elastomer composition obtained by, so-called dynamic crosslinking, which is crosslinking during melt kneading of a radically non-crosslinkable resin such as polypropylene (PP) and a radically crosslinkable elastomer in an extruder in the presence of a radical initiator, is widely used in machine parts and the like. As such rubbery compositions, an olefin-based elastomer composition or the like using ethylene-propylene-diene rubber (EPDM) is known (see Patent Documents 1 and 2). A composition obtained by dynamically crosslinking hydrogenated rubber is also known (see Patent Documents 3 and 4). Furthermore, disclosed is a thermoplastic elastomer composition containing an olefin-based resin, and a hydrogenated product of a copolymer of a vinyl aromatic compound and a conjugated diene compound (see Patent Documents 5 and 6).

Patent Document 1: Japanese Patent Laid-Open No. 8-120127
Patent Document 2: Japanese Patent Laid-Open No. 9-137001
Patent Document 3: Japanese Patent No. 2737251
Patent Document 4: Japanese Patent Laid-Open No. 2004-67798
Patent Document 5: Japanese Patent Laid-Open No. 2001-49051
Patent Document 6: Japanese Patent Laid-Open No. 2005-89656

SUMMARY OF THE INVENTION

Problems to be Solved by the Invention

However, the olefin-based elastomer composition manufactured by the ethylene-propylene-diene rubber (EPDM) has insufficient scratch resistance and abrasion resistance. The composition dynamically crosslinked by using the hydrogenated rubber has insufficient low-temperature characteristics. Furthermore, there is a need for the thermoplastic elastomer composition excellent in not only mechanical properties, scratch resistance, and abrasion resistance but also flexibility, and low-temperature characteristics.

Thus, in light of the above circumstances, a main object of the present invention is to provide a thermoplastic elastomer composition having excellent flexibility, mechanical properties, scratch resistance, abrasion resistance, and low-temperature characteristics.

Means for Solving the Problems

The present inventors have diligently studied in order to solve the above-mentioned problems. As a result, the inventors have discovered that the problems can be solved by a thermoplastic elastomer composition comprising, in predetermined amounts, (A) an ethylene-α-olefin copolymer comprising an ethylene unit and an α-olefin unit having 3 to 20 carbon atoms, (B) a copolymer having at least one hydrogenated copolymer block mainly composed of a conjugated diene monomer unit and a vinyl aromatic monomer unit, (C) a hydrogenated product of a block copolymer having at least one conjugated diene monomer unit block and at least one vinyl aromatic monomer unit block, and (D) an olefin-based resin, thus they have accomplished the present invention.

Specifically, a thermoplastic elastomer composition of the present invention will be described below.

[1]
A crosslinked thermoplastic elastomer composition comprising
5 to 70 parts by mass of (C) a hydrogenated product of a block copolymer having at least one conjugated diene monomer unit block and at least one vinyl aromatic monomer unit block, and
20 to 150 parts by mass of (D) an olefin-based resin,
based on 100 parts by mass of the total of (A) an ethylene-α-olefin copolymer comprising an ethylene unit and an α-olefin unit having 3 to 20 carbon atoms, and (B) a copolymer having at least one hydrogenated copolymer block mainly composed of a conjugated diene monomer unit and a vinyl aromatic monomer unit,
wherein a mass ratio ((A)/(B)) of the (A) component and the (B) component is from 20/80 to 75/25.

[2]
The thermoplastic elastomer composition according to [1], wherein a content of the vinyl aromatic monomer unit in the (B) component is from 30 to 90% by mass.

[3]
The thermoplastic elastomer composition according to [1] or [2], wherein the (B) component further comprises 5 to 50% by mass of a block mainly composed of a vinyl aromatic monomer unit.

[4]
The thermoplastic elastomer composition according to any one of [1] to [3], wherein at least one of tan δ peak temperatures of the (B) component is present within a range of from −25 to 40° C.

[5]
The thermoplastic elastomer composition according to any one of [1] to [4], wherein a content of a vinyl aromatic monomer unit in the (C) component is from 20 to 80% by mass.

[6]
The thermoplastic elastomer composition according to any one of [1] to [5], wherein the mass ratio ((A)/(B)) of the (A) component and the (B) component is from 25/75 to 60/40.

[7]
The thermoplastic elastomer composition according to any one of [1] to [6], wherein a content of the (C) component is from 10 to 50 parts by mass based on 100 parts by mass of the total of the (A) component and the (B) component.

[8]
The thermoplastic elastomer composition according to any one of [1] to [7], wherein a hydrogenated product of a block copolymer of at least two of (C-1) a hydrogenated product in which a content of the vinyl aromatic monomer unit block is 20% by mass or more and 50% by mass or less, and (C-2) a hydrogenated product in which a content of the vinyl aromatic monomer unit block is more than 50% by mass and 80% by mass or less are employed in combination as (C) the hydrogenated product of the block copolymer.

[9]
The thermoplastic elastomer composition according to any one of [1] to [8], wherein the (D) component is a propylene-based resin.
[10]
The thermoplastic elastomer composition according to any one of [1] to [9], further comprising (E) a softener.
[11]
The thermoplastic elastomer composition according to any one of [1] to [10], wherein the thermoplastic elastomer composition is crosslinked by a crosslinking agent.
[12]
The thermoplastic elastomer composition according to any one of [1] to [11], wherein the thermoplastic elastomer composition has a JIS-A hardness within a range of from 60 to 90.
[13]
The thermoplastic elastomer composition according to any one of [1] to [12], wherein the thermoplastic elastomer composition has a tensile elongation of 80% or more at −30° C.

Advantageous Effects of Invention

The present invention can provide a thermoplastic elastomer composition having excellent flexibility, mechanical properties, scratch resistance, abrasion resistance, and low-temperature characteristics.

DESCRIPTION OF THE PREFERRED EMBODIMENTS

An embodiment for carrying out the present invention (hereinafter, referred to simply as "present embodiment") will now be described in more detail. The following present embodiment is an illustrative example for describing the present invention, and does not limit the present invention to what is described below. The present invention may be carried out with various appropriate modifications made within the scope of the invention.

A thermoplastic elastomer composition according to the present embodiment comprises 5 to 70 parts by mass of (C) a hydrogenated product of a block copolymer having at least one conjugated diene monomer unit block and at least one vinyl aromatic monomer unit block, and 20 to 150 parts by mass of (D) an olefin-based resin, based on 100 parts by mass of the total of (A) an ethylene-α-olefin copolymer comprising an ethylene unit and an α-olefin unit having 3 to 20 carbon atoms, and (B) a copolymer having at least one hydrogenated copolymer block mainly composed of a conjugated diene monomer unit and a vinyl aromatic monomer unit, wherein a mass ratio ((A)/(B)) of the (A) component and the (B) component is from 20/80 to 75/25.

(A) Component

The (A) component is an ethylene-α-olefin copolymer comprising an ethylene unit and an α-olefin unit having 3 to 20 carbon atoms. The (A) component can be obtainable by at least copolymerizing ethylene and an α-olefin having 3 to 20 carbon atoms. Examples of the α-olefin having 3 to 20 carbon atoms may include propylene, butane-1, pentene-1, hexane-1, 4-methylpentene-1, heptene-1, octene-1, nonene-1, decene-1, undecene-1, and dodecene-1. Of these, from the viewpoint of applying flexibility, α-olefins having 3 to 20 carbon atoms are preferable, and propylene, butene-1, and octene-1 are more preferable.

A monomer having an unsaturated bond can be copolymerized with the (A) component as necessary. Preferable examples of the monomer having an unsaturated bond may include conjugated diolefins such as butadiene and isoprene; non-conjugated diolefins such as 1,4-hexadiene; cyclic diene compounds such as dicyclopentadiene and norbornene derivatives; and acetylenes. Of these, ethylidene norbornene (ENB) and dicyclopentadiene (DCP) are more preferable from the viewpoint of flexibility.

A Mooney viscosity (ML) of the (A) component measured at 100° C. is not particularly limited. However, the Mooney viscosity (ML) is preferably from 20 to 150 mL, and more preferably from 50 to 120 mL from the viewpoint of crosslinking reactivity and flexibility of the composition.

The (A) component is preferably manufactured using a metallocene-based catalyst. The metallocene-based catalyst generally comprises a cyclopentadienyl derivative of group IV metal such as titanium or zirconium, and a co-catalyst. The metallocene-based catalyst is not particularly limited, and a known metallocene-based catalyst can be used. The metallocene-based catalyst is not only highly active as a polymerization catalyst, but also can provide a copolymer having a narrow molecular weight distribution and having a uniform distribution of an α-olefin having 3 to 20 carbon atoms as the comonomer in the copolymer, compared to Ziegler-based catalyst.

A copolymerization ratio of the α-olefin in the (A) component is not particularly limited. However, the copolymerization ratio is preferably from 1 to 60% by mass, more preferably from 10 to 50% by mass, and still more preferably from 20 to 45% by mass. Mechanical strength (tensile strength or the like) and flexibility of a thermoplastic elastomer composition can be further improved by setting the copolymerization ratio of the α-olefin within the above-mentioned range.

The density of the (A) component is not particularly limited. However, the density is preferably within the range of from 0.8 to 0.9 g/cm$^3$. The (A) component having this range of density can be used to provide a thermoplastic elastomer composition more excellent in flexibility.

The structure of the (A) component is not particularly limited. However, the (A) component preferably has long-chain branching. Herein, the long-chain branching means branching having 3 or more carbon atoms. The presence of long-chain branching enables the density to be further decreased compared to the copolymerization ratio (% by mass) of the copolymerized α-olefin, without reducing the mechanical strength. As a result, a thermoplastic elastomer composition having lower density and higher strength can be provided. The olefin-based elastomer having long-chain branching is not particularly limited. For example, an olefin-based elastomer described in U.S. Pat. No. 5,278,272 and the like can be used.

The (A) component preferably has a melting point peak at room temperature or higher in a differential scanning calorimeter (DSC). When the (A) component has the melting point peak at room temperature or higher, there can be provided a thermoplastic elastomer which has excellent shape stability within the temperature range of the melting point or lower, and is excellent in handleability and less sticky.

The (A) component preferably has a melt index ranging from 0.01 to 100 g/10 minutes (190° C., 2.16 kg load (0.212 Pa) according to ASTM D1238), and more preferably from 0.2 to 10 g/10 minutes. A thermoplastic elastomer having more excellent balance between flowability and mechanical strength can be provided by setting the melt index within the above-mentioned range.

(B) Component

The (B) component is a copolymer having at least one hydrogenated copolymer block mainly composed of a conjugated diene monomer unit and a vinyl aromatic monomer unit. In the present embodiment, the nomenclature of each of the monomer units constituting the copolymer follows the nomenclature of a monomer from which the monomer unit is derived. For example, the "vinyl aromatic monomer unit" means a constitutional unit of a polymer produced as a result of polymerization of a vinyl aromatic compound which is a monomer. The structure is a molecular structure in which 2 carbons of a substituted ethylene group derived from a substituted vinyl group serve as a binding site. The "conjugated diene monomer unit" means a constitutional unit of a polymer produced as a result of polymerization of a conjugated diene which is a monomer. The structure is a molecular structure in which 2 carbons of olefin derived from a conjugated diene monomer serve as a binding site.

In the present embodiment, "mainly composed of" means containing 60% by mass or more of a monomer unit in a copolymer. It is preferable to contain 80% by mass or more of the monomer unit, more preferably 90% by mass or more, and still more preferably 95% by mass or more.

In the present embodiment, examples of the vinyl aromatic monomer unit may include vinyl aromatic compounds such as styrene, α-methylstyrene, p-methylstyrene, divinylbenzene, 1,1-diphenylethylene, N,N-dimethyl-p-aminoethyl styrene, and N,N-diethyl-p-aminoethyl styrene. These may be used singly or in combination of two or more. Of these, styrene is preferable from the viewpoint of economy.

In the present embodiment, the conjugated diene is a diolefin having a pair of conjugated double bonds. Examples thereof may include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Of these, 1,3-butadiene and isoprene are preferable. A diolefin mainly composed of 1,3-butadiene is more preferable from the viewpoint of mechanical strength. These may be used singly or in combination of two or more.

In the present embodiment, a polymerization method of the (B) component is not particularly limited, and a known method can be used. Examples of the polymerization method of the (B) component may include methods described in Japanese Patent Publication Nos. 36-19286, 43-17979, 46-32415, 49-36957, 48-2423, 48-4106, 56-28925, and Japanese Patent Laid-Open Nos. 59-166518 and 60-186577 and the like.

The mass ratio of the conjugated diene monomer unit and the vinyl aromatic monomer unit in the hydrogenated copolymer block in the (B) component is not particularly limited. However, the mass ratio of the conjugated diene monomer unit and the vinyl aromatic monomer unit in the hydrogenated copolymer block in the (B) component is preferably from 90:10 to 10:90, more preferably from 80:20 to 20:80, and still more preferably from 70:30 to 30:70.

The percentage of the vinyl aromatic monomer unit contained in the (B) component is preferably 30% by mass or more, more preferably 40% by mass or more, and still more preferably 45% by mass or more from the viewpoint of scratch resistance, heat resistance, and dispersibility. The percentage of the vinyl aromatic monomer unit is preferably 90% by mass or less, and more preferably 80% by mass or less from the viewpoint of flexibility.

The percentage of a block further contained in the (B) component and mainly composed of the vinyl aromatic monomer unit is preferably 5% by mass or more from the viewpoint of mechanical strength and preferably 50% by mass or less from the viewpoint of flexibility, more preferably 10% by mass or more and 35% by mass or less, and still more preferably 13% by mass or more and 30% by mass or less.

The content of the vinyl aromatic compound polymer block in the copolymer of the (B) component is defined according to the following formula by using a mass of the vinyl aromatic compound polymer block (except a vinyl aromatic compound polymer having an average polymerization degree of 30 or less) obtained using a method of oxidatively decomposing the copolymer before hydrogenation, with tert-butyl hydroperoxide in the presence of osmium tetroxide as a catalyst (the method described in I. M. Kolthoff, et al., J. Polym. Sci. 1,429 (1946) and hereinafter referred to as an "osmium tetroxide oxidative decomposition method").

Content (% by mass) of vinyl aromatic compound polymer block=(mass of vinyl aromatic compound polymer block in copolymer before hydrogenation/mass of copolymer before hydrogenation)×100

When a plurality of polymer blocks are present in the (B) component, the structure such as the molecular weight and composition or the like of each of the blocks may the same or different. There may be a hydrogenated copolymer block mainly composed of the conjugated diene unit and the vinyl aromatic monomer unit, and a hydrogenated copolymer block mainly composed of the conjugated diene monomer unit in the (B) component. The boundary and farthest portion of each of the polymer blocks may not necessarily be distinguished clearly. The distribution of the vinyl aromatic monomer unit in each of the polymer blocks is not limited as long as the content of the vinyl aromatic compound falls within the aforementioned range. The distribution may be even, tapered, staircase, convex, or concave. A crystalline portion may be present in each of the polymer blocks.

The distribution situation of the vinyl unit of a conjugated diene unit in each of the polymer blocks is not particularly limited, and deviation may be present in the distribution. Examples of a method for controlling the distribution of the vinyl unit may include a method for adding a vinylating agent during polymerization, and a method for changing a temperature during polymerization. Deviation may be present in a distribution of a hydrogenation ratio of the conjugated diene unit. Examples of a method for controlling the distribution of the hydrogenation ratio may include a method for changing the distribution situation of the vinyl unit, and a method for copolymerizing isoprene and butadiene, hydrogenating using a catalyst described below, and utilizing a difference between hydrogenation rates of an isoprene unit and a butadiene unit.

In the (B) component, the hydrogenation ratio of unsaturated bonds contained in the conjugated diene unit before hydrogenation is preferably 75 mol % or more, more preferably 85 mol % or more, and still more preferably 97 mol % or more from the viewpoint of heat resistance, aging resistance, and weather resistance.

A hydrogenation catalyst is not particularly limited, and conventionally known ones are usable, for example, (1) a support type heterogeneous hydrogenation catalyst having a metal such as Ni, Pt, Pd, Ru or the like supported on carbon, silica, alumina, diatomaceous earth or the like, (2) a so-called Ziegler type hydrogenation catalyst using an organic acid salt of Ni, Co, Fe, Cr or the like or a transition metal salt such as acetylacetone salt and a reducing agent such as organoaluminum, and (3) a homogeneous hydrogenation catalyst such as so-called organometallic complex, e.g., an organometallic compound of Ti, Ru, Rh, Zr or the like. As specific examples, the hydrogenation catalysts described in Japanese Patent Publication Nos. 42-8704, 43-6636, 63-4841, 1-37970, 1-53851 and 2-9041 are usable. Preferable examples of the hydrogenation catalysts may include a titanocene compound and/or a mixture thereof with a reducing organometallic compound. As the titanocene compounds, for example, compounds described in Japanese Patent Laid-Open No. 8-109219 are usable.

Examples of the titanocene compound may include compounds having at least one ligand having a (substituted) cyclopentadienyl skeleton, indenyl skeleton or fluorenyl skeleton, such as biscyclopentadienyltitanium dichloride and monopentamethylcyclopentadienyltitanium trichloride. Examples of the reducing organometallic compound may include organic alkali metal compounds such as organolithium, organomagnesium compounds, organoaluminum compounds, organoboric compounds, or organozinc compounds.

A peak temperature of loss tangent (tan δ) of the (B) component is not particularly limited. However, the (B) component preferably has at least one peak at 40° C. or less from the viewpoint of flexibility, and preferably has at least one peak at −25° C. or more from the viewpoint of abrasion resistance. The loss tangent can be measured using a viscoelasticity measuring apparatus described in Examples described later.

The vinyl content in the conjugated diene contained before hydrogenation in the (B) component is preferably 5 mol % or more from the viewpoint of flexibility and scratch resistance, and preferably 70 mol % or less from the viewpoint of productivity, high breaking elongation, and scratch resistance. The vinyl content in the conjugated diene is more preferably within the range of 10 mol % or more and 50 mol % or less, still more preferably within the range of 10 mol % or more and 30 mol % or less, and yet still more preferably within the range of 10 mol % or more and 25 mol % or less.

The vinyl content means the proportion, before hydrogenation, of the conjugated dienes incorporated with 1,2-bond and 3,4-bond to those incorporated with the binding modes of 1,2-bond, 3,4-bond, and 1,4-bond. A vinyl bond content can be measured by nuclear magnetic resonance spectrum analysis (NMR).

The (B) component may have a polar group as necessary. Examples of the polar group may include a hydroxy group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boric acid group, a boron-containing group, a boronate group, an alkoxy tin group, and a phenyl tin group.

A weight average molecular weight of the (B) component is preferably 50,000 or more from the viewpoint of scratch resistance, preferably 400,000 or less from the viewpoint of forming flowability, more preferably within the range of from 50,000 to 300,000, and still more preferably within the range of from 100,000 to 250,000. A molecular weight distribution (weight average molecular weight/number average molecular weight) is preferably smaller. The weight average molecular weight can be determined by gel permeation chromatography (GPC) under conditions described in Examples.

A mass ratio ((A)/(B)) of a content of the (A) component and a content of the (B) component is from 20/80 to 75/25, and preferably from 25/75 to 60/40 from the viewpoint of flexibility and scratch resistance.

(C) Component

The (C) component is a hydrogenated product of a block copolymer having at least one conjugated diene monomer unit block and at least one vinyl aromatic monomer unit block. As in the definition of the (B) component, the "conjugated diene monomer unit" means a constitutional unit of a polymer produced as a result of polymerization of conjugated diene which is a monomer. The structure is a molecular structure in which 2 carbons of olefin derived from a conjugated diene monomer serve as a binding site. The "vinyl aromatic monomer unit" means a constitutional unit of a polymer produced as a result of polymerization of a vinyl aromatic compound which is a monomer. The structure is a molecular structure in which 2 carbons of a substituted ethylene group derived from a substituted vinyl group serve as a binding site.

The conjugated diene monomer is a diolefin having a pair of conjugated double bonds. Examples thereof may include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Preferable examples may include 1,3-butadiene, and isoprene. These may be used singly or in combination of two or more.

Examples of the vinyl aromatic monomer unit may include vinyl aromatic compounds such as styrene, α-methylstyrene, p-methylstyrene, divinylbenzene, 1,1-diphenylethylene, N,N-dimethyl-p-aminoethyl styrene, and N,N-diethyl-p-aminoethyl styrene. These may be used singly or in combination of two or more. Of these, styrene is preferable from the viewpoint of economy.

A hydrogenated product of a block copolymer of the present embodiment is a hydrogenated product of a block copolymer having at least one conjugated diene monomer unit block and at least one aromatic vinyl monomer unit block. With the proviso that the polymer block composed of the aromatic vinyl monomer unit is represented by "S" and the polymer block composed of the conjugated diene monomer unit and/or the partially hydrogenated conjugated diene monomer unit is represented by "B", the hydrogenated product of the block copolymer may be represented by, for example, the following formulae: a linear block copolymer represented by SB, S(BS)$_{n1}$ (n1 represents an integer of 1 to 3), S(BSB)$_{n2}$ (n2 represents an integer of 1 to 2), or (SB)$_{n3}$X (n represents an integer of 3 to 6 and X represents a residue of a coupling agent such as silicon tetrachloride, tin tetrachloride or a polyepoxy compound).

Of these, preferable is a star-like block copolymer in which the "B" portion is a bonding center. Of these, more preferable are linear block copolymers of di-block SB, tri-block SBS and tetra-block SBSB.

The content of the vinyl aromatic monomer unit in the (C) component is preferably from 20 to 80% by mass from the viewpoint of low-temperature characteristics, mechanical strength, and oil retainability, and more preferably from 30 to 70% by mass from the viewpoint of heat resistance and dispersibility. In the (C) component, the hydrogenation ratio of the unsaturated bonds contained in the conjugated diene unit before hydrogenation is preferably 75 mol % or more from the viewpoint of heat resistance, aging resistance, and weather resistance. The hydrogenation ratio is more preferably 85 mol % or more, and still more preferably 97 mol % or more.

As the (C) component, two or more (C) components, i.e., two or more hydrogenated products of block copolymers are preferably employed in combination. As the (C) component, at least one is a (C-1) vinyl aromatic monomer unit block of which the content is 20% by mass or more and 50% by mass or less. At least the other is a (C-2) vinyl aromatic monomer unit block of which the content is more than 50% by mass and 80% by mass or less. The (C-1) component contributes to improvement in low-temperature characteristics. The (C-2)

component acts as a compatibilizing agent for a crosslinking rubber component and an olefin component, and serves to raise the mechanical strength of the thermoplastic elastomer composition. Furthermore, since the (C) component is a component which is poorly crosslinked, the thermoplastic elastomer composition can also hold a larger amount of a softener as a (F) component.

A hydrogenation catalyst is not particularly limited. For example, there can be used a support type heterogeneous hydrogenation catalyst, a Ziegler type hydrogenation catalyst, and a homogeneous hydrogenation catalyst such as organometallic complex which are usable in manufacture of the (B) component. Of these, a titanocene compound and/or a mixture thereof with a reducing organometallic compound are preferable.

In the present embodiment, the polymerization method of the block copolymer of the (C) component before hydrogenation is not particularly limited, and a known method can be used. Examples of the polymerization method may include methods described in Japanese Patent Publication Nos. 36-19286, 43-17979, 46-32415, 49-36957, 48-2423, 48-4106, and 56-28925, and Japanese Patent Laid-Open Nos. 59-166518, and 60-186577.

The (C) component may have a polar group as necessary. Examples of the polar group may include a hydroxy group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boric acid group, a boron-containing group, a boronate group, an alkoxy tin group, and a phenyl tin group.

A weight average molecular weight of the (C) component is preferably 50,000 or more from the viewpoint of scratch resistance, preferably 400,000 or less from the viewpoint of forming flowability, and more preferably within the range of from 50,000 to 300,000. A molecular weight distribution (=weight average molecular weight/number average molecular weight) is preferably smaller. The weight average molecular weight can be determined by gel permeation chromatography (GPC) under conditions described in Examples.

A content of the (C) component based on 100 parts by mass of the total of the (A) component and the (B) component is from 5 to 70 parts by mass, preferably from 10 to 50 parts by mass from the viewpoint of low-temperature characteristics and flexibility, and more preferably from 10 to 30 parts by mass.

(D) Component

The (D) component is an olefin-based resin. Of the olefin-based resins, a propylene-based resin is preferable from the viewpoint of mechanical strength. Preferable examples of the propylene-based resin may include an isotactic polypropylene which is a homopolymer; and an isotactic copolymer (including a block copolymer or a random copolymer) of propylene and other α-olefin such as ethylene, butene-1, pentene-1, or hexene-1. The olefin resin preferably has a melt index ranging from 0.1 to 100 g/10 minutes (230° C., 2.16 kg load (0.212 MPa)). The melt index of 100 g/10 minutes or less can further improve the heat resistance and mechanical strength of the thermoplastic elastomer composition. The melt index of 0.1 g/10 minutes or more can further improve the flowability and forming processability thereof.

The content of the (D) component is from 20 to 150 parts by mass based on 100 parts by mass of the total of the (A) and (B) components, and preferably from 40 to 100 parts by mass from the viewpoint of low-temperature characteristics and flexibility. The content of less than 20 parts by mass disadvantageously reduces the forming flowability of the thermoplastic elastomer composition. The content of more than 150 parts by mass disadvantageously causes the insufficient flexibility of the thermoplastic elastomer composition.

The thermoplastic elastomer composition of the present embodiment is crosslinked. The crosslinking method is not particularly limited. The thermoplastic elastomer is preferably crosslinked by a crosslinking agent. More specifically, the crosslinking agent contains a crosslinking initiator, and preferably additionally contains a polyfunctional monomer and a monofunctional monomer as a crosslinking auxiliary agent as necessary. The content of the crosslinking initiator is not particularly limited. However, the content thereof is preferably less than 2 parts by mass based on 100 parts by mass of the (D) olefin-based resin, and more preferably less than 1.7 parts by mass.

The crosslinking initiator is not particularly limited, and examples thereof may include radical initiators such as organic peroxides and organic azo compounds. Specific examples thereof may include: peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, and n-butyl-4,4-bis(t-butylperoxy)valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-bis(t-butylperoxy)hexane, and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-toluoyl peroxide; peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate, and cumylperoxy octate; and hydroperoxides such as t-butyl hydroperoxide, cumene hydroperoxide, diisopropylbenzene hydroperoxide, 2,5-dimethylhexane-2,5-dihydroperoxide, and 1,1,3,3-tetramethylbutyl peroxide.

Of these compounds, preferable are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The polyfunctional monomer as the crosslinking auxiliary agent preferably has a radical polymerizable functional group as a functional group, and the functional group is more preferably a vinyl group. The number of the functional groups is preferably two or more, and it is particularly effective to have three or more functional groups in combination with the monofunctional monomer.

Preferable specific examples of the polyfunctional monomer may include divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyloxyethane and 1,2-polybutadiene. Of these, divinylbenzene and triallyl isocyanurate are more preferable. These polyfunctional monomers may be used alone, or two or more kinds of them may be used in combination.

The monofunctional monomer as the crosslinking auxiliary agent is preferably a radical polymerizable vinyl monomer. The vinyl monomer can control a crosslinking reaction rate. Examples of the vinyl monomer may include aromatic vinyl monomers; unsaturated nitrile monomers such as acrylonitrile and methacrylonitrile; acrylic ester monomers; methacrylic ester monomers; acrylic acid monomers; methacrylic acid monomers; maleic anhydride monomers; and N-substituted maleimide monomers.

(E) Component

The thermoplastic elastomer composition preferably further contains (E) a softener. The softener is not particularly limited. However, the softener is preferably a process oil composed of a hydrocarbon such as a paraffinic, naphthenic, or aromatic hydrocarbon. Of these, preferable is a process oil mainly composed of a paraffinic hydrocarbon or, from the viewpoint of compatibility with rubber, a naphthenic hydrocarbon. From the viewpoint of heat and light stability, the content of the aromatic hydrocarbon in the process oil is preferably 10% or less, more preferably 5% or less, and still more preferably 1% or less in terms of a carbon number ratio according to ASTM D2140-97.

The content of the (E) component is preferably from 5 to 500 parts by mass, and more preferably from 10 to 150 parts by mass based on 100 parts by mass of the total of the (A), (B), (C), and (D) components from the viewpoint of adjusting the hardness and flexibility of the composition. In the amount of 5 parts by mass or more, flexibility and processability can be further improved. In the amount of 500 parts by mass or less, oil bleed can be further suppressed.

(F) Component

The thermoplastic elastomer composition preferably further contains (F) a polyorganosiloxane. The structure of the polyorganosiloxane is not particularly limited. However, the polyorganosiloxane has a polymer structure having a crosslinking structure such as straight-chain and branch structures from the viewpoint of abrasion resistance and touch feeling. The polyorganosiloxane preferably has a kinematic viscosity (25° C.) of 5,000 centistokes (cSt) or more as specified by JIS-K2410. The useful polyorganosiloxane is generally a polymer containing siloxane units substituted with an alkyl group, a vinyl group and/or an aryl group. Polydimethylsiloxane substituted with a methyl group is more preferable.

The content of the (F) component is preferably from 0.1 to 20 parts by mass, and more preferably from 1.0 to 10 parts by mass based on 100 parts by mass of the total of the (A), (B), (C), and (D) components. In the amount of 0.1 part by mass or more, abrasion property can be improved. In the amount of 20 parts by mass or less, bleed of the polydimethylsiloxane can be further suppressed.

The thermoplastic elastomer composition may contain an inorganic filler and a plasticizer as long as the effects thereof are not deteriorated. Examples of the inorganic filler used herein may include calcium carbonate, magnesium carbonate, silica, carbon black, glass fiber, titanium oxide, clay, mica, talc, magnesium hydroxide, and aluminium hydroxide. Examples of the plasticizer may include phthalate esters such as polyethylene glycol and dioctyl phthalate (DOP). The thermoplastic elastomer composition may further contain other additives such as an organic or inorganic pigment, a heat stabilizer, an antioxidant, an ultraviolet absorber, a light stabilizer, a flame retardant, a silicone oil, an antiblocking agent, a foaming agent, an antistatic agent, and antimicrobial agent.

For manufacture of the thermoplastic elastomer composition, general means used to manufacture conventional resin and elastomer compositions, such as a Banbury mixer, a kneader, a single screw extruder and a twin screw extruder may be employed. Of these, the twin screw extruder, in particular, is preferable from the viewpoint of attaining effective dynamic crosslinking. The twin screw extruder can disperse the (A), (B), (C), and (D) components uniformly and finely, and induce crosslinking reaction by further adding other components. As a result, preferably, the thermoplastic elastomer composition can be continuously manufactured.

The thermoplastic elastomer composition of the present embodiment is preferably manufactured through the following processing process.

The (A), (B), (C), and (D) components are charged into an extruder hopper after mixing well. The timing of addition of the crosslinking agent is not limited. For example, the crosslinking agent may be added at initial stage together with the (A), (B), (C), and (D) components. Alternatively, part of the crosslinking agent may be added from a middle feed section of the extruder. Furthermore, part of the (A), (B), (C), and (D) components may be added from the middle feed section of the extruder.

The timing of addition of the (E) softener is not limited. For example, the softener may be added from the middle feed section of the extruder. Alternatively, the softener may be separately added at initial and middle stages. Even in this case, part of the crosslinking agent may be added from the middle feed section of the extruder as necessary. Furthermore, the additive and the softener may be previously mixed, followed by addition of the mixture.

The timing of addition of (F) a polyorganosiloxane is not limited. The polyorganosiloxane may be added at initial stage. The polyorganosiloxane may be separately added at initial and middle stages. The polyorganosiloxane may be added at the middle stage. A method for adding the (F) component is not particularly limited. A method for adding a master batch previously containing an organosiloxane having a high concentration using any thermoplastic resin or elastomer may be used.

The (A) component, the (B) component, and the crosslinking agent are subjected to a crosslinking reaction in heat melting and kneading in the extruder. Simultaneously, the olefin-based resin of the (D) component and the crosslinking agent may be subjected to a decomposition reaction to improve forming flowability. From this viewpoint, a radical decomposable type olefin-based resin is preferably used as the (D) component. Furthermore, pellets made of a thermoplastic elastomer composition of the present embodiment can be obtained by melt kneading by the addition of the (E) softener or the like to perform a crosslinking reaction, kneading and dispersing sufficiently before taking out the pellets from the extruder.

Particularly preferable examples of the melt extruding method may include a method for using a twin screw extruder having a length L in a die direction considering a material adding part as the base point, wherein an L/D is within the range of from 5 to 100 (herein, D represents a barrel diameter). The twin screw extruder preferably has a plurality of feed parts, that is, a main feed part and a side feed part, at different lengths from the extruder tip. The twin screw extruder preferably has kneading zones between the feed parts and between the tip and the feed part locating closer to the tip, wherein the length of each kneading zone is from 3D to 10D.

The twin screw extruder as one of the manufacturing units capable of being used in the present embodiment may be a co-rotating screw type or a counter rotating screw type. The screw type may also be any of non-intermeshing, partially intermeshing and complete intermeshing types. A counter rotating and partial intermeshing type screw is preferable for the case of obtaining a uniform resin under low shear force at low temperature. For the case of requiring somewhat great kneading, a co-rotating and complete intermeshing type screw is preferable. For the case of requiring further greater kneading, a co-rotating and complete intermeshing type screw is preferable.

A degree M of kneading during kneading using the twin screw extruder from the viewpoint of applying excellent mechanical strength to the obtained thermoplastic elastomer composition more preferably satisfies a relationship of the following Formula (I).

$$10 \times 10^6 \leq M \leq 1000 \times 10^6 \quad (1)$$

Degree M of kneading: $(\pi^2/2)(L/D) D^3 (N/Q)$,
L: a length (mm) of an extruder in a die direction considering a material adding part as the base point,
D: an inner diameter (mm) of an extruder barrel,
Q: a discharge rate (kg/h),
N: a screw rotation speed (rpm)

Swelling and condensation of rubber particles can be prevented by setting the degree M of kneading to $10 \times 10^6$ or more in Formula (1) to exhibit good appearance. Reduction of mechanical strength caused by excessive shear force can be prevented by setting the degree M of kneading to $1000 \times 10^6$ or less. The elastomer composition thus obtained can be used to produce various moldings using any molding method. The molding method is not particularly limited. However, injection molding, extrusion, compression molding, blow molding, calendaring, and foaming, or the like are preferable.

The thermoplastic elastomer composition of the present embodiment preferably has a JIS-A hardness within the range of from 60 to 90. Thereby, all of flexibility, mechanical properties, scratch resistance, abrasion resistance and low-temperature characteristics can be further satisfied. The thermoplastic elastomer composition of the present embodiment preferably has a tensile elongation of 80% or more at −30° C. Thereby, the thermoplastic elastomer composition having more excellent low-temperature characteristics can be provided.

EXAMPLES

The present invention will hereinafter be described in further detail with reference to Examples and Comparative Examples. The present invention is however not limited thereto. Test methods used for evaluating various physical properties in Examples are as follows.
(1) Hydrogenation Ratio (%)
The hydrogenation ratio was measured by nuclear magnetic resonance spectrum analysis (NMR).
(2) Styrene Content, 1,4-Bond/1,2-Bond Unit, Amount of Ethylene Unit or Butylene Unit
Contents of a vinyl aromatic monomer unit, a 1,4-bond unit and a 1,2-bond unit of butadiene, and an amount of an ethylene unit or a butylene unit were measured by nuclear magnetic resonance spectral analysis (NMR).

The NMR measurement was conducted under the following conditions:
Measuring apparatus: JNM-LA400 (trade name, manufactured by JEOL Ltd.)
Solvent: Deuterated chloroform
Sample concentration: 50 mg/mL
Observed frequency: 400 MHz
Chemical shift standard: TMS (tetramethylsilane)
Pulse delay: 2.904 seconds
Number of scans: 64
Pulse width: 45°
Measurement temperature: 26° C.
(3) Styrene Polymer Block Content (Os Value)
The styrene polymer block content was measured by the osmium tetroxide oxidative decomposition method described in I. M. Kolthoff, et al., J. Polym. Sci. 1, 429 (1946) using a copolymer before hydrogenation. For the decomposition of the unhydrogenated copolymer, a solution obtained by dissolving 0.1 g of osmic acid in 125 mL of tertiary butanol was used. The styrene polymer block content obtained herein is referred to as an "Os value".
(4) Weight Average Molecular Weight and Molecular Weight Distribution
The weight average molecular weight and the molecular weight distribution were measured by gel permeation chromatography. The weight average molecular weight and the molecular weight distribution were measured at an oven temperature of 40° C. by using LC-10 (trade name, manufactured by Shimadzu Corporation) as a measuring apparatus, two columns of TSKgeIGMHXL (4.6 mm ID×30 cm), and tetrahydrofuran (1.0 mL/min) as a solvent. A weight average molecular weight (Mw), a number average molecular weight (Mn), and a molecular weight distribution (Mw/Mn) were determined as a molecular weight in terms of polystyrene.
(5) Peak Temperature of Loss Tangent (tan δ)
The peak temperature of loss tangent was determined by measuring a viscoelastic spectrum using a viscoelastic measuring analyzer (type: DVE-V4; manufactured by Rheology Co., Ltd.). The viscoelastic spectrum was measured under conditions of a strain of 0.1% and a frequency of 1 Hz.
(6) Surface Hardness
The surface hardness (JIS-A hardness) was measured as an index of the flexibility. Four sheets having a thickness of 2 mm were overlapped. The surface hardness was evaluated in an atmosphere of 23° C. according to JIS K7215.
(7) Mechanical Properties
Tensile breaking strength (MPa) was evaluated in an atmosphere of 23° C. according to JIS K6251.
(8) Low-Temperature Characteristics
Tensile breaking elongation (%) was evaluated in an atmosphere of −30° C. according to JIS K6251.
(9) Scratch Resistance
A wedge having a tip in the shape of a rectangle of 10 mm×1 mm and a weight of 300 g was dropped onto a sheet from 5 cm height. Scratch on the sheet generated by dropping was visually observed. The evaluation thereof was performed according to the following criteria.
A: Excellent
B: Good
C: Good, but conspicuous scratch
D: Significant scratch
(10) Abrasion Resistance
The abrasion resistance of a molding was evaluated using a Gakushin-type rubbing tester (manufactured by Tester Sangyo Co., Ltd., AB-301, "COLOR FASTNESS RUBBING TESTER"). The measurement conditions are as follows:
Temperature Condition: atmosphere of 23° C.
Stroke: 120 mm
Frequency: 1 reciprocation/2 sec Load: 1 kg
Friction Cloth: 100% cotton cloth, Canequim No. 3 (according to JIS L0803), folded in three and attached
Contact Area: 1 cm².

Abrasion resistance was evaluated by measuring the number of times of reciprocation of friction until a height of an emboss of a surface skin of the molding is decreased to 50%.

Components used in Examples and Comparative Examples are as follows:

Manufacture of (A) Ethylene-α-Olefin Copolymers
(1) Copolymer of Ethylene and Octene-1 (TPE-1)

The copolymer of ethylene and octene-1 was manufactured by a method using a metallocene catalyst as described in Japanese Patent Laid-Open No. 3-163088. The obtained copolymer has a composition ratio of ethylene/octene-1 of 72/28 (mass ratio) (hereinafter, referred to as "TPE-1").

(2) Ethylene-Propylene-Ethylidene Norbornene (ENB) Copolymer (TPE-2)

The ENB copolymer was manufactured by a method using a metallocene catalyst as described in Japanese Patent Laid-Open No. 3-163088. The obtained copolymer has a composition ratio of ethylene/propylene/ENB of 72/24/4 (mass ratio) (hereinafter, referred to as "TPE-2").

Manufacture of (B) Hydrogenated Copolymer and (C) Hydrogenated Product of Block Copolymer
(1) Preparation of Hydrogenation Catalyst The hydrogenation catalyst used for a hydrogenation reaction of the (B) component and the (C) component was prepared by a method described below.

1 L of dried and purified cyclohexane was charged in a reaction vessel whose atmosphere was replaced by nitrogen; 100 mmol of biscyclopentadienyltitanium dichloride was added thereto, and an n-hexane solution containing 200 mmol of trimethylaluminum was added thereto under full stirring; and the mixture was reacted at room temperature for about 3 days.

(2)-1 Manufacture of (B) Hydrogenated Copolymer (HSBR-1)

Batch polymerization was carried out using a tank reactor (internal volume: 10 L) with a stirring apparatus and a jacket. Tetramethylethylenediamine (TMEDA) and n-butyllithium were previously added thereto so that the number of moles of TMEDA was 0.35 times that of Li of n-butyllithium to prepare an n-butyllithium initiator. After 6.4 L of cyclohexane and 100 g of styrene were added to the reactor, the n-butyllithium initiator was added so that the number of moles of Li of the n-butyllithium initiator was 9 mmol to carry out a polymerization at an initial temperature of 65° C. After the polymerization completion, a cyclohexane solution containing 300 g of butadiene and 500 g of styrene (monomer concentration: 22% by mass) was continuously fed to the reactor with constant speed for 60 minutes. After the polymerization completion, a cyclohexane solution containing 100 g of styrene (monomer concentration: 22% by mass) was added thereto for 10 minutes to obtain a copolymer.

The obtained copolymer had a styrene content of 70% by mass, and a styrene polymer block content of 20% by mass. The copolymer block (that is, a copolymer block mainly composed of a conjugated diene monomer unit and a vinyl aromatic monomer unit) had a styrene content of 62.5% by mass. Butadiene had a 1,2-bond unit content of 16%.

100 ppm of the above-mentioned hydrogenation catalyst in terms of titanium was added based on 100 parts by mass of the obtained copolymer, and a hydrogenation reaction was carried out at a hydrogen pressure of 0.7 M Pa and at a temperature of 75° C. to obtain a polymer solution. Octadecyl-3-(3, 5-di-t-butyl-4-hydroxyphenyl)propionate as a stabilizer was added to the obtained polymer solution. 0.3 part by mass of the stabilizer was added to 100 parts by mass of the hydrogenated copolymer (hereinafter, referred to as "HSBR-1").

The weight average molecular weight of the obtained hydrogenated copolymer (HSBR-1) was 170,000, and the hydrogenation ratio in a double bond of butadiene contained in the hydrogenated copolymer was 99%. It was confirmed that one of tan δ peaks obtained by measurement of viscoelasticity was present at 12° C.

(HSBR-2)

Batch Polymerization was Carried Out Using a Tank Reactor (Internal Volume: 10 L) with a stirring apparatus and a jacket. TMEDA and n-butyllithium were previously added thereto so that the number of moles of TMEDA was 0.25 times that of Li of n-butyllithium to prepare an n-butyllithium initiator. After 6.4 L of cyclohexane and 75 g of styrene were added to the reactor, the n-butyllithium initiator was added so that the number of moles of Li of the n-butyllithium initiator was 10 mmol to carry out a polymerization at an initial temperature of 65° C. After the polymerization completion, a cyclohexane solution containing 470 g of butadiene and 380 g of styrene (monomer concentration: 22% by mass) was continuously fed to the reactor with constant speed for 60 minutes. After the polymerization completion, a cyclohexane solution containing 75 g of styrene (monomer concentration: 22% by mass) was added thereto for 10 minutes to obtain a copolymer.

The obtained copolymer had a styrene content of 53% by mass, and a styrene polymer block content of 15% by mass. The copolymer block (that is, a copolymer block mainly composed of a conjugated diene monomer unit and a vinyl aromatic monomer unit) had a styrene content of 45% by mass. Butadiene had a 1,2-bond unit content of 23%.

100 ppm of the above-mentioned hydrogenation catalyst in terms of titanium was added based on 100 parts by mass of the obtained copolymer, and a hydrogenation reaction was carried out at a hydrogen pressure of 0.7 M Pa and at a temperature of 75° C. to obtain a polymer solution. Octadecyl-3-(3, 5-di-t-butyl-4-hydroxyphenyl)propionate as a stabilizer was added to the obtained polymer solution. 0.3 part by mass of the stabilizer was added to 100 parts by mass of the hydrogenated copolymer (hereinafter, referred to as "HSBR-2").

The weight average molecular weight of the obtained hydrogenated copolymer (HSBR-2) was 160,000, and the hydrogenation ratio in a double bond of butadiene contained in the hydrogenated copolymer was 99%. It was confirmed that one of tan δ peaks obtained by measurement of viscoelasticity was present at −11° C.

(2)-2 Manufacture of Hydrogenated Product of (C) Block Copolymer
(SEBS-1)

Batch polymerization was carried out using a tank reactor (internal volume: 10 L) with a stirring apparatus and a jacket. TMEDA and n-butyllithium were previously added thereto so that the number of moles of TMEDA was 0.30 times that of Li of n-butyllithium to prepare an n-butyllithium initiator. After 6.4 L of cyclohexane and 175 g of styrene were added to the reactor, the n-butyllithium initiator was added so that the number of moles of Li of the n-butyllithium initiator was 11 mmol to carry out a polymerization at an initial temperature of 65° C. After the polymerization completion, a cyclohexane solution containing 650 g of butadiene (monomer concentration: 22% by mass) was continuously fed to the reactor with constant speed for 60 minutes. After the polymerization completion, a cyclohexane solution containing 175 g of styrene (monomer concentration: 22% by mass) was added thereto for 10 minutes to obtain a copolymer.

The obtained copolymer had a styrene content of 35% by mass. Butadiene had a 1,2-bond unit content of 36%.

100 ppm of the above-mentioned hydrogenation catalyst in terms of titanium was added based on 100 parts by mass of the obtained copolymer, and a hydrogenation reaction was carried out at a hydrogen pressure of 0.7 MPa and at a temperature of 75° C. to obtain a polymer solution. Octadecyl-3-(3,5-di-t-butyl-4-hydroxyphenyl)propionate as a stabilizer was added to the obtained polymer solution. 0.3 part by mass of the stabilizer was added to 100 parts by mass of a hydrogenated product of a block copolymer (hereinafter, referred to as "SEBS-1").

The weight average molecular weight of the obtained hydrogenated copolymer (SEBS-1) was 150,000, and the hydrogenation ratio in a double bond of butadiene contained in the hydrogenated copolymer was 99%.

(SEBS-2)

Batch Polymerization was Carried Out Using a Tank Reactor (Internal Volume: 10 L) with a stirring apparatus and a jacket. TMEDA and n-butyllithium were previously added thereto so that the number of moles of TMEDA was 0.40 times that of Li of n-butyllithium to prepare an n-butyllithium initiator. After 6.4 L of cyclohexane and 325 g of styrene were added to the reactor, the n-butyllithium initiator was added so that the number of moles of Li of the n-butyllithium initiator was 20 mmol to carry out a polymerization at an initial temperature of 65° C. After the polymerization completion, a cyclohexane solution containing 350 g of butadiene (monomer concentration: 22% by mass) was continuously fed to the reactor with constant speed for 60 minutes. After the polymerization completion, a cyclohexane solution containing 325 g of styrene (monomer concentration: 22% by mass) was added thereto for 10 minutes to obtain a copolymer.

The obtained copolymer had a styrene content of 65% by mass. Butadiene had a 1,2-bond unit content of 40%.

100 ppm of the above-mentioned hydrogenation catalyst in terms of titanium was added based on 100 parts by mass of the obtained copolymer, and a hydrogenation reaction was carried out at a hydrogen pressure of 0.7 MPa and at a temperature of 75° C. to obtain a polymer solution. Octadecyl-3-(3,5-di-t-butyl-4-hydroxyphenyl)propionate as a stabilizer was added to the obtained polymer solution. 0.3 part by mass of the stabilizer was added to 100 parts by mass of a hydrogenated product of a block copolymer (hereinafter, referred to as "SEBS-2").

The weight average molecular weight of the obtained hydrogenated copolymer (SEBS-2) was 50,000, and the hydrogenation ratio in a double bond of butadiene contained in the hydrogenated copolymer was 99%.

(D) Olefin-based Resin (PP-1)

Polypropylene: Manufactured by Sunallomer Ltd., Homopolymer Type (Melt Index at 230° C. under a load of 2.16 kg: 0.5 g/10 minutes, according to ASTM D1238) (hereinafter, referred to as "PP-1")

(PP-2)

Polypropylene: manufactured by SunAllomer Ltd., Block copolymer type (melt index at 230° C. under a load of 2.16 kg: 0.35 g/10 minutes, according to ASTM D1238) (hereinafter, referred to as "PP-2")

(E) Paraffin-based Oil

Diana Process Oil PW-90, manufactured by Idemitsu Kosan Co., Ltd. (hereinafter, referred to as "MO")

Crosslinking Agent (i) Crosslinking Initiator 2,5-dimethyl-2,5-bis(t-butylperoxy)hexane, manufactured by NOF Corporation (trade name: Perhexa 25B) (hereinafter, referred to as "PDX")

(ii) Polyfunctional Monomer

Triallyl isocyanurate, manufactured by Nippon Kasei Chemical Co., Ltd. (hereinafter, referred to as "TAIC")

Divinylbenzene, manufactured by Wako Pure Chemical Industries, Ltd. (hereinafter, referred to as "DVB")

(F) Polyorganosiloxane

Dimethylsiloxane (manufactured by Dow Corning Toray Co., Ltd., SH200) 60000cST (hereinafter, referred to as "MSI")

EXAMPLES AND COMPARATIVE EXAMPLES

As an extruder, a twin screw extruder (40 mmφ, L/D=47, L: a length (mm) of the extruder in a die direction considering a material adding part as the base point, D: an inner diameter of an extruder barrel) equipped with an oil fill port provided at a barrel center part was used. As a screw, a two-thread screw having kneading parts provided at the front and back of the fill port was used. After materials described in Table 1 other than paraffin oil (MO) were collectively mixed at composition ratios (ratio of part by mass) described in Table 1, the mixture was introduced into the twin screw extruder (a cylinder temperature of 200° C.) by a quantitative feeder. Then, paraffin oil (MO) of amounts (ratio of part by mass) described in Table 1 was filled from the fill port provided at the central part of the extruder by a pump to carry out melt extrusion, thereby obtaining elastomer compositions.

Each of the elastomer compositions thus obtained was compressively molded at 200° C. to produce a 2-mm thick sheet. The various characteristics of the obtained sheet were evaluated. Furthermore, the sheet was injection molded at a cylinder temperature of 200° C. using an injection molding machine to produce a plate (length in MD direction: 15 cm, length in TD direction: 9 cm) having a surface on which skin embosses were formed and a back surface which is a specular surface. The plate was cut to prepare 2.5 cm-square samples. The abrasion resistance of a skin emboss surface of each of the samples was evaluated using the Gakushin-type rubbing tester in two number of measuring times (n number: 2). Furthermore, sensory tests by touch feeling were carried out on the specular surface of the back surface of the sample. The results are shown in Tables 1 and 2.

TABLE 1

| | | | Examples | | | | | | | |
|---|---|---|---|---|---|---|---|---|---|---|
| | | | 1 | 2 | 3 | 4 | 5 | 6 | 7 | 8 |
| Compositions | | | Parts by mass | | | | | | | |
| (A) | TPE-1 | | 50 | 50 | 35 | 60 | | 60 | 25 | 50 |
| | TPE-2 | | | | 15 | 15 | 50 | | | |
| (B) | HSBR-1 | | 50 | 50 | 50 | 25 | 50 | | | 50 |
| | HSBR-2 | | | | | | | 40 | 75 | |

TABLE 1-continued

|  |  | Examples | | | | | | | |
|---|---|---|---|---|---|---|---|---|---|
|  |  | 1 | 2 | 3 | 4 | 5 | 6 | 7 | 8 |
| (C) | SEBS-1 | 10 | 10 |  | 10 | 15 | 10 | 10 | 10 |
|  | SEBS-2 | 10 | 10 | 10 |  | 5 | 10 | 10 | 10 |
| (D) | PP-1 | 65 |  |  |  |  | 65 | 65 | 60 |
|  | PP-2 |  | 60 | 60 | 60 | 60 |  |  |  |
| Crosslinking initiator | POX | 1 | 1 | 1 | 1 | 1 | 1 | 1 | 1 |
| Polyfunctional monomer | TAIC | 1 | 1 | 1 | 1 | 1 | 1 | 1 | 1 |
|  | DVB | 0.5 | 0.5 | 0.5 | 0.5 | 0.5 | 0.5 | 0.5 | 0.5 |
| (E) | MO | 80 | 80 | 60 | 80 | 60 | 80 | 80 | 80 |
| (F) | MSI | 6 | 6 | 5 | 5 | 0 | 6 | 6 | 6 |
| Evaluation items |  | Evaluation | | | | | | | |
| Hardness | JIS-A | 80 | 78 | 72 | 75 | 73 | 76 | 79 | 71 |
| Mechanical properties | Tensile strength (MPa) | 6.5 | 7.2 | 7.4 | 6.2 | 6.5 | 7.0 | 7.4 | 6.4 |
| Scratch resistance |  | A | A | B | B | B | B | A | B |
| Abrasion resistance | Number of times of reciprocation | 30000 | 28000 | 26000 | 29000 | 17000 | 25000 | 22000 | 20000 |
| Low-temperature characteristics | Tensile elongation (%) | 110 | 100 | 80 | 150 | 110 | 170 | 120 | 90 |

TABLE 2

|  |  | Comparative Examples | | | | | |
|---|---|---|---|---|---|---|---|
|  |  | 1 | 2 | 3 | 4 | 5 | 6 |
| Compositions |  | Parts by mass | | | | | |
| (A) | TPE-1 | 100 | 50 | 10 | 50 | 50 | 50 |
|  | TPE-2 |  |  |  |  |  |  |
| (B) | HSBR-1 | 0 | 50 | 90 | 50 | 50 | 50 |
|  | HSBR-2 |  |  |  |  |  |  |
| (C) | SEBS-1 | 10 | 0 | 10 | 10 | 10 | 70 |
|  | SEBS-2 | 10 | 0 | 10 | 10 | 10 | 10 |
| (D) | PP-1 | 65 | 65 | 65 | 160 | 10 | 65 |
|  | PP-2 |  |  |  |  |  |  |
| Crosslinking initiator | POX | 1 | 1 | 1 | 1 | 1 | 1 |
| Polyfunctional monomer | TAIC | 1 | 1 | 1 | 1 | 1 | 1 |
|  | DVB | 0.5 | 0.5 | 0.5 | 0.5 | 0.5 | 0.5 |
| (E) | MO | 80 | 80 | 80 | 80 | 80 | 80 |
| (F) | MSI | 6 | 6 | 6 | 6 | 6 | 6 |
| Evaluation items |  | Evaluation | | | | | |
| Hardness | JIS-A | 68 | 75 | 88 | 92 | 55 | 75 |
| Mechanical properties | Tensile strength (MPa) | 7.0 | 7.0 | 7.5 | 8.4 | 4.7 | 6.1 |
| Scratch resistance |  | D | C | B | D | D | D |
| Abrasion resistance | Number of times of reciprocation | 3000 | 25000 | 11000 | 23000 | 6000 | 4000 |
| Low-temperature characteristics | Tensile elongation (%) | 50 | 20 | 70 | 30 | 150 | 180 |

As shown in Table 1, it was confirmed that the thermoplastic elastomer composition of each of Examples had excellent flexibility, mechanical properties, scratch resistance, abrasion resistance, and low-temperature characteristics. On the other hand, as shown in Table 2, since Comparative Example 1 had a small additive amount of the hydrogenated copolymer of the (B) component, it was at least confirmed that Comparative Example 1 had insufficient scratch resistance and abrasion resistance. It was at least confirmed that Comparative Example 2 had insufficient low-temperature characteristics when the (C) component was not added. Furthermore, Comparative Example 2 is not preferable since Comparative Example 2 has a sticky surface. It was confirmed that Comparative Example 3 had insufficient abrasion resistance, low-temperature characteristics, and flexibility evaluated from hardness when Comparative Example 3 had a small additive amount of the (A) component. It was at least confirmed that Comparative Example 4 had excessively high hardness, insufficient flexibility, and insufficient scratch resistance and low-temperature characteristics when Comparative Example 4 had a great additive amount of the (D) component. It was at least confirmed that Comparative Example 5 had insufficient mechanical strength, scratch resistance, and abrasion resistance when Comparative Example 5 had a low content of the (D) component. It was at least confirmed that Comparative Example 6 had insufficient scratch resistance and abrasion resistance when Comparative Example 6 had a great additive amount of a hydrogenated product of a block copolymer of the (C) component.

The present application is based on the Japanese patent application (Japanese Patent Application No. 2008-314801) filed with the Japan Patent Office on Dec. 10, 2008, the contents of which are incorporated herein by reference.

Industrial Applicability

The thermoplastic elastomer composition according to the present invention can be widely used for applications including machine parts, electrical parts, cables, hoses, belts, toys, miscellaneous goods, daily necessaries, construction materials, sheets, and films.

What is claimed is:

1. A crosslinked thermoplastic elastomer composition comprising
    5 to 70 parts by mass of (C) a hydrogenated product of a block copolymer having at least one conjugated diene monomer unit block and at least one vinyl aromatic monomer unit block, and
    20 to 150 parts by mass of (D) an olefin-based resin,
    based on 100 parts by mass of the total of (A) an ethylene-a-olefin copolymer comprising an ethylene unit and an a-olefin unit having 3 to 20 carbon atoms, and (B) a copolymer having at least one hydrogenated copolymer block mainly composed of a conjugated diene monomer unit and vinyl aromatic monomer unit,
    wherein at least one of tan δ peak temperature of the (B) component is present within a range of from −25 to 40° C., the hydrogenated product of a block copolymer (C) comprises at least two hydrogenated products of block copolymers (C-1) and (C-2), wherein the (C-1) is a hydrogenated product in which a content of the vinyl aromatic monomer unit block is 20% by mass or more and 50% by mass or less, and the (C-2) is a hydrogenated product in which a content of the vinyl aromatic monomer unit block is more than 50% by mass and 80% by mass or less, and
    a mass ratio ((A)/(B)) of the (A) component and the (B) component is from 20/80 to 75/25.

2. The thermoplastic elastomer composition according to claim 1, wherein a content of the vinyl aromatic monomer unit in the (B) component is from 30 to 90% by mass.

3. The thermoplastic elastomer composition according to claim 1 or 2, wherein the (B) component further comprises 5 to 50% by mass of a block mainly composed of a vinyl aromatic monomer unit.

4. The thermoplastic elastomer composition according to claim 1 or 2, wherein a content of a vinyl aromatic monomer unit in the (C) component is from 20 to 80% by mass.

5. The thermoplastic elastomer composition according to claim 1 or 2, wherein the mass ratio ((A)/(B)) of the (A) component and the (B) component is from 25/75 to 60/40.

6. The thermoplastic elastomer composition according to claim 1 or 2, wherein a content of the (C) component is from 10 to 50 parts by mass based on 100 parts by mass of the total of the (A) component and the (B) component.

7. The thermoplastic elastomer composition according to claim 1 or 2, wherein the (D) component is a propylene-based resin.

8. The thermoplastic elastomer composition according to claim 1 or 2, further comprising (E) a softener.

9. The thermoplastic elastomer composition according to claim 1 or 2, wherein the thermoplastic elastomer composition is crosslinked by a crosslinking agent.

10. The thermoplastic elastomer composition according to claim 1 or 2, wherein the thermoplastic elastomer composition has a JIS-A hardness within a range of from 60 to 90.

11. The thermoplastic elastomer composition according to claim 1 or 2, wherein the thermoplastic elastomer composition has a tensile elongation of 80% or more at −30° C.

* * * * *